US008358377B2

(12) United States Patent  
Ahn et al.

(10) Patent No.: US 8,358,377 B2
(45) Date of Patent: Jan. 22, 2013

(54) IMAGE DISPLAY APPARATUS AND OPERATING METHOD THEREOF

(75) Inventors: Kyu Tae Ahn, Seoul (KR); Jae Kyung Lee, Seoul (KR); Gyu Seung Kim, Seoul (KR); Kun Sik Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 447 days.

(21) Appl. No.: 12/630,567

(22) Filed: Dec. 3, 2009

(65) Prior Publication Data

US 2010/0302444 A1     Dec. 2, 2010

(30) Foreign Application Priority Data

Jun. 2, 2009  (KR) .................. 10-2009-0048754

(51) Int. Cl.
*H04N 5/445* (2011.01)
*H04N 5/50* (2006.01)

(52) U.S. Cl. ........ 348/564; 348/570; 348/569; 348/732; 725/41

(58) Field of Classification Search .......... 348/564–570, 348/731–733; 725/41
See application file for complete search history.

(56) References Cited

U.S. PATENT DOCUMENTS

| 5,801,785 | A | 9/1998 | Crump et al. |
| 5,818,439 | A | 10/1998 | Nagasaka et al. |
| 5,900,868 | A | 5/1999 | Duhault |
| 6,118,493 | A | 9/2000 | Duhault et al. |
| 6,483,983 | B1 | 11/2002 | Takahashi et al. |
| 7,757,252 | B1 | 7/2010 | Agasse |
| 2002/0166122 | A1 | 11/2002 | Kikinis et al. |
| 2003/0229894 | A1 | 12/2003 | Okada et al. |
| 2004/0022313 | A1 | 2/2004 | Kim |
| 2004/0128317 | A1 | 7/2004 | Sull et al. |
| 2005/0228806 | A1 | 10/2005 | Haberman |
| 2005/0235312 | A1 | 10/2005 | Karaoguz et al. |
| 2006/0150215 | A1 | 7/2006 | Wroblewski |
| 2007/0083911 | A1 | 4/2007 | Madden et al. |
| 2007/0136750 | A1 | 6/2007 | Abanami et al. |
| 2007/0204238 | A1 | 8/2007 | Hua et al. |
| 2007/0250896 | A1 | 10/2007 | Parker et al. |
| 2008/0127258 | A1* | 5/2008 | Walker et al. .............. 725/39 |
| 2009/0019479 | A1 | 1/2009 | Kwak et al. |
| 2009/0064222 | A1 | 3/2009 | Dawson et al. |
| 2009/0083824 | A1 | 3/2009 | McCarthy et al. |
| 2010/0306800 | A1 | 12/2010 | Jung et al. |
| 2010/0306801 | A1 | 12/2010 | Filippov et al. |

FOREIGN PATENT DOCUMENTS

| EP | 1 511 304 | 3/2005 |
| EP | 1 758 383 | 2/2007 |
| EP | 1 971 142 | 9/2008 |
| JP | 2004-096688 | 3/2004 |
| WO | WO 01/06381 | 1/2001 |

(Continued)

OTHER PUBLICATIONS

European Search Report dated Sep. 23, 2010.

(Continued)

*Primary Examiner* — Michael Lee
(74) *Attorney, Agent, or Firm* — Ked & Associates LLP

(57) ABSTRACT

A method of operating an image display apparatus includes generating a thumbnail image based on an input signal, detecting an error in the thumbnail image, and displaying the thumbnail image if no error is detected in the thumbnail image.

19 Claims, 12 Drawing Sheets

FOREIGN PATENT DOCUMENTS

| | | |
|---|---|---|
| WO | WO 01/71719 | 9/2001 |
| WO | WO 2007/105876 | 9/2007 |
| WO | WO 2008/038881 | 4/2008 |

OTHER PUBLICATIONS

European Search Report dated Sep. 30, 2010.
US Office Action for U.S. Appl. No. 12/630,471 dated Dec. 27, 2011.
US Office Action for U.S. Appl. No. 12/630,609 dated Jan. 18, 2012.
European Search Report dated Jul. 21, 2010.
US Office Action for U.S. Appl. No. 12/630,609 dated May 23, 2012.
US Office Action for U.S. Appl. No. 12/630,471 dated Aug. 21, 2012.

* cited by examiner

[FIG. 4A]
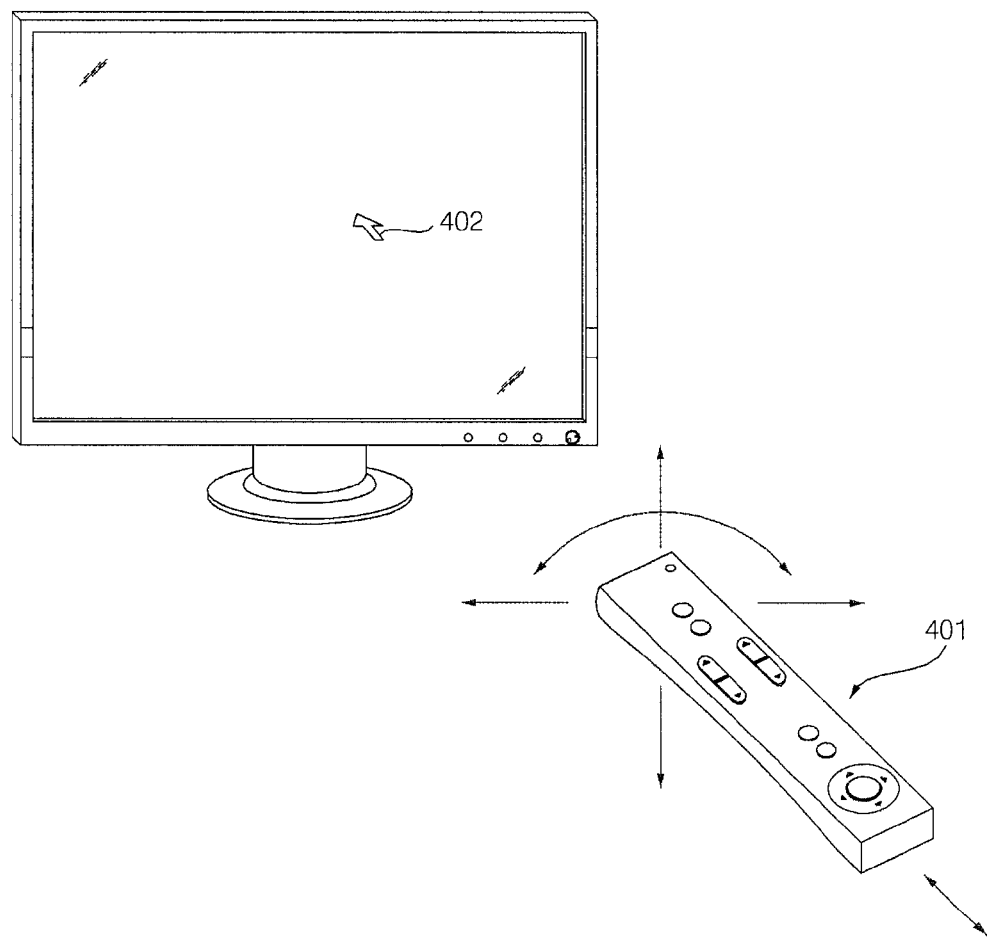

[FIG. 4B]
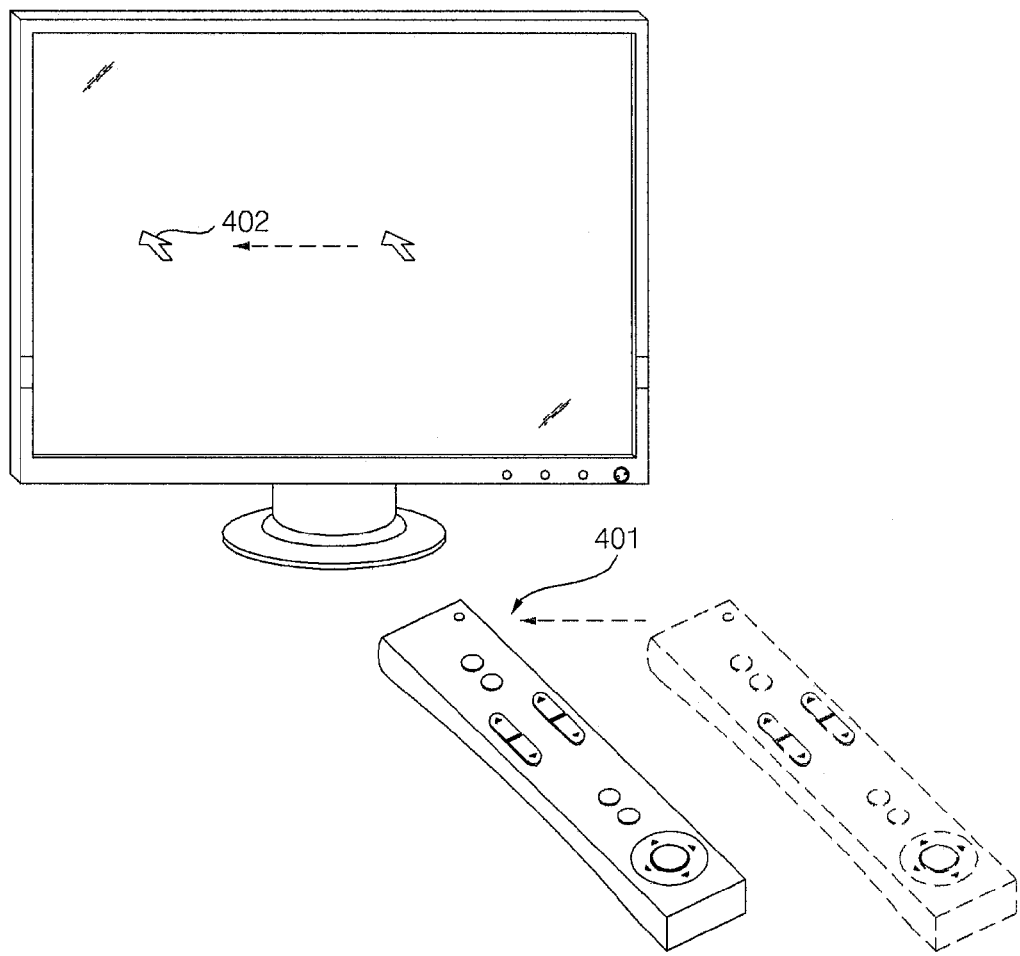

[FIG. 5]
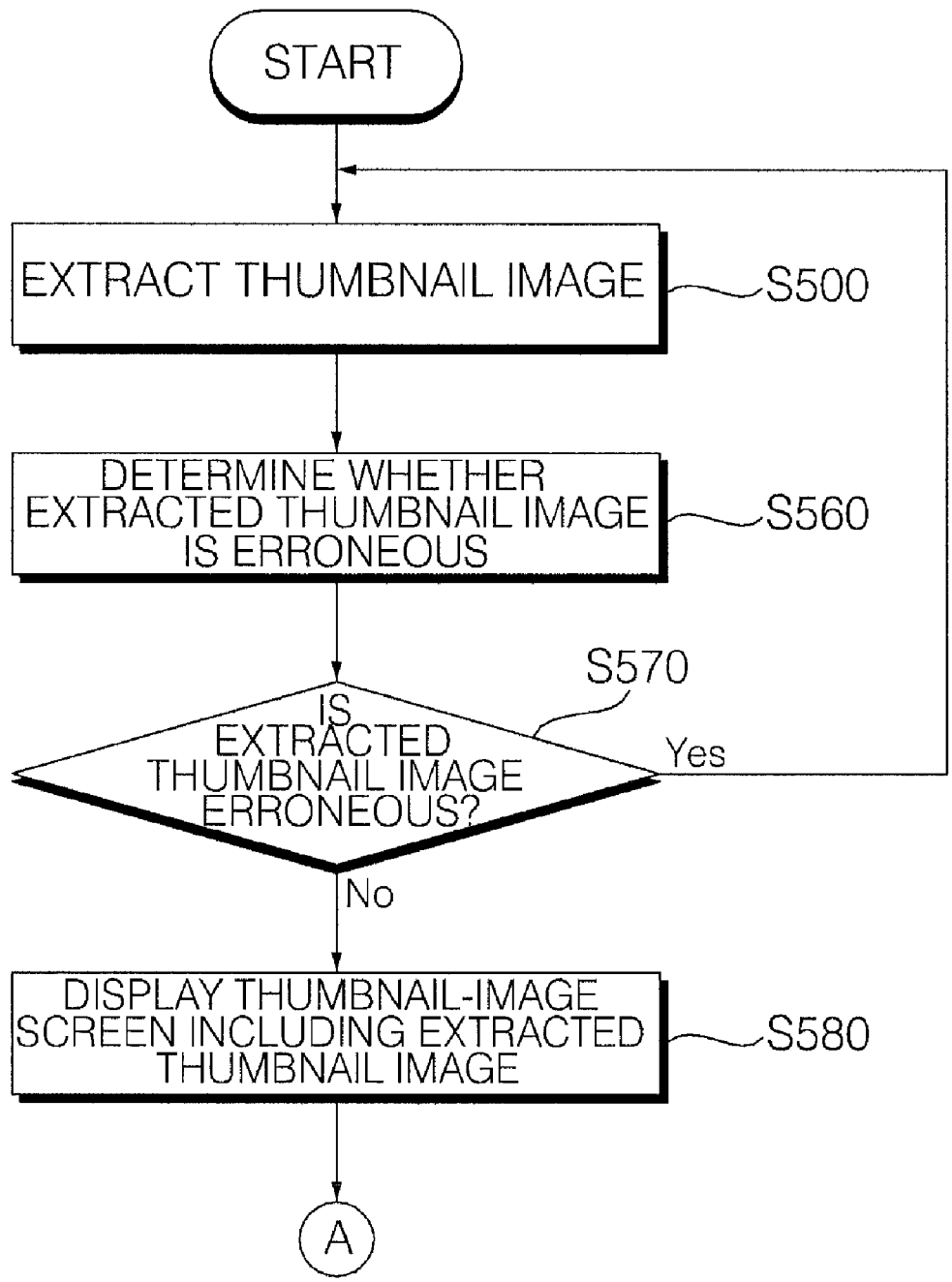

[FIG. 6]
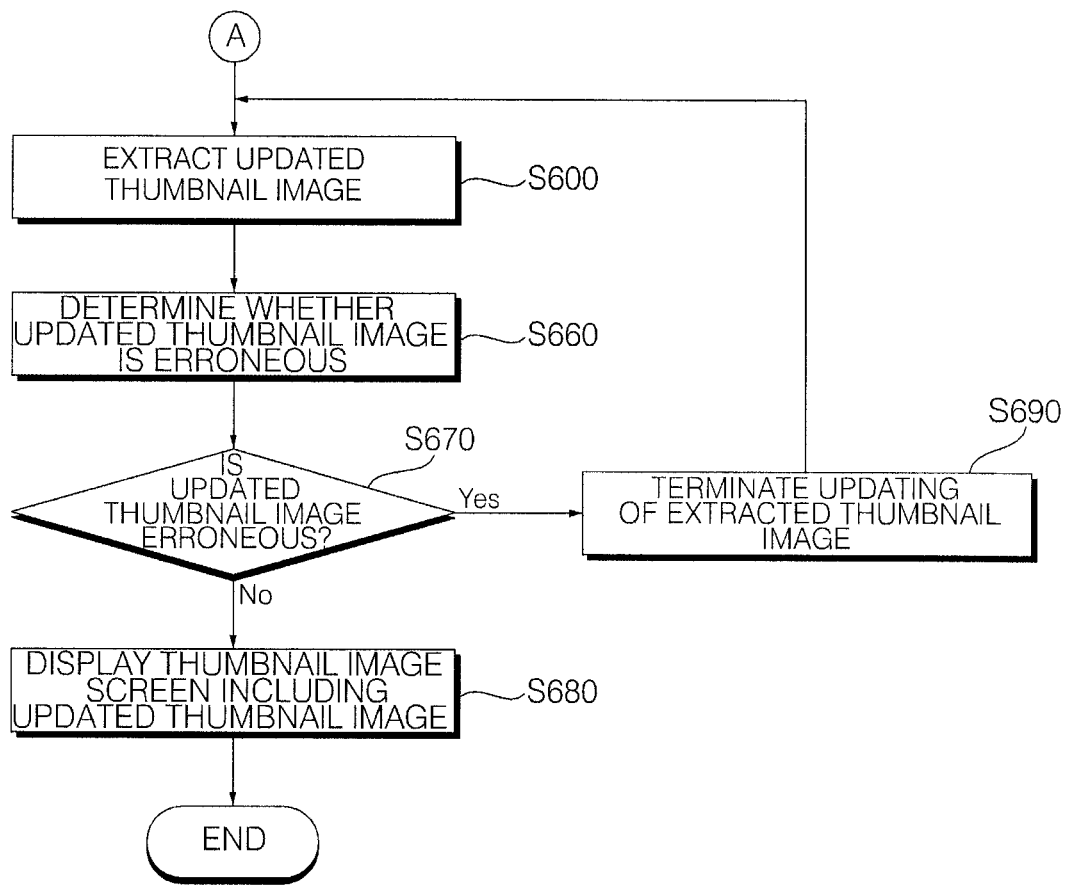

[FIG. 7]
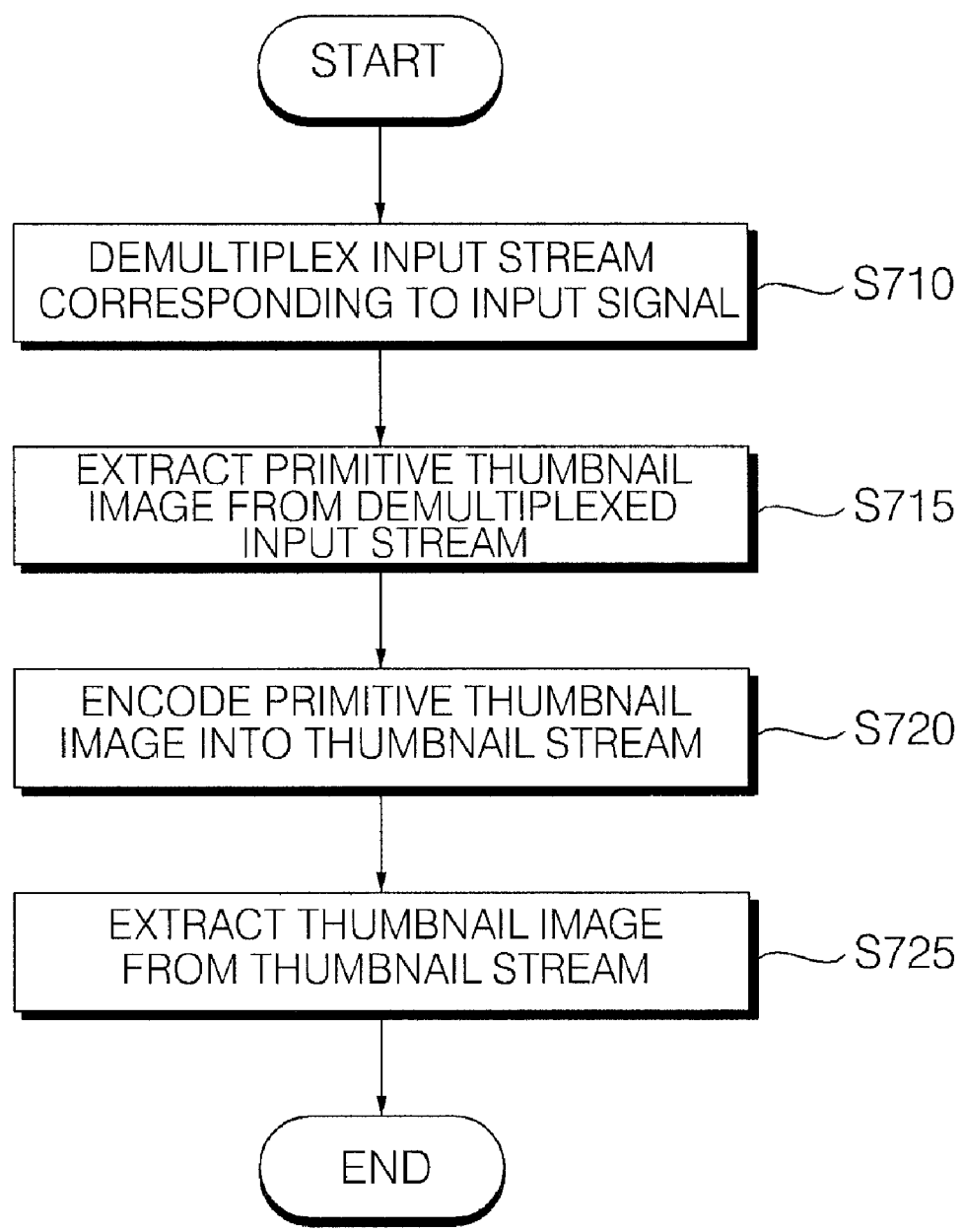

[FIG. 8]
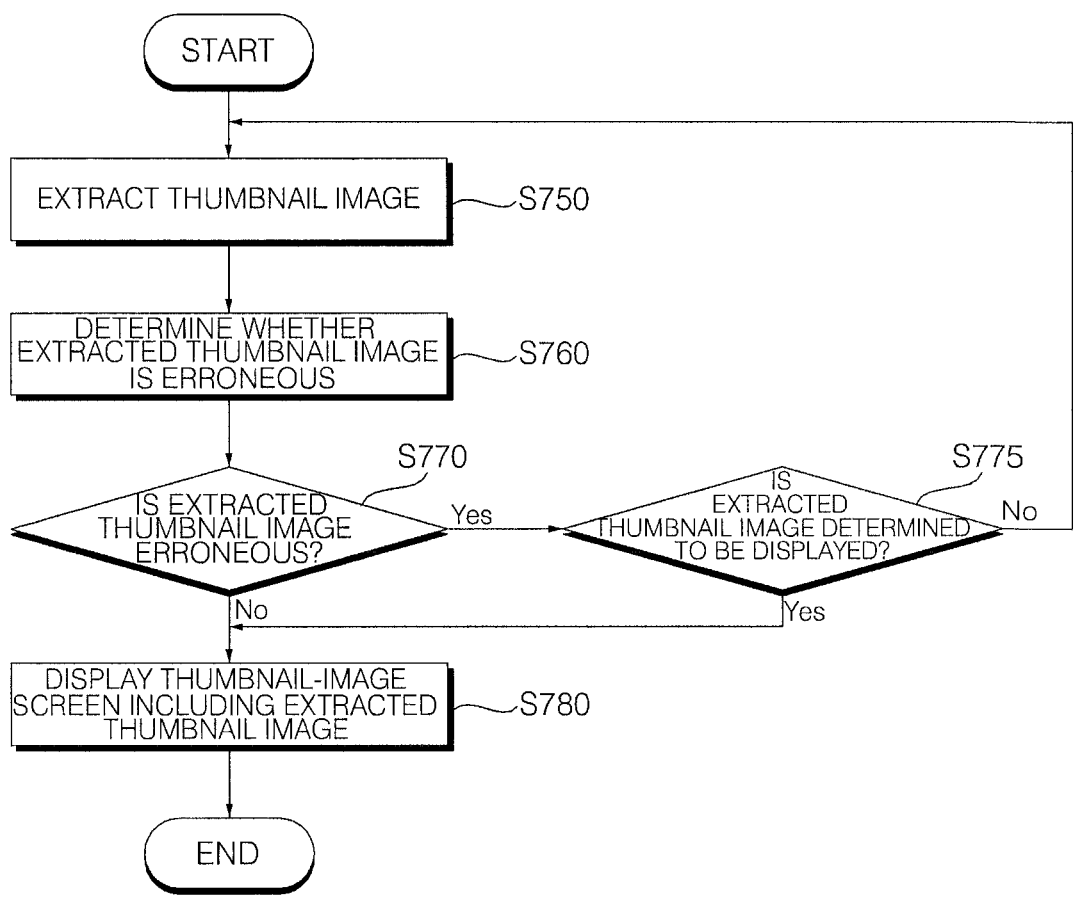

[FIG. 9]

[FIG. 10]
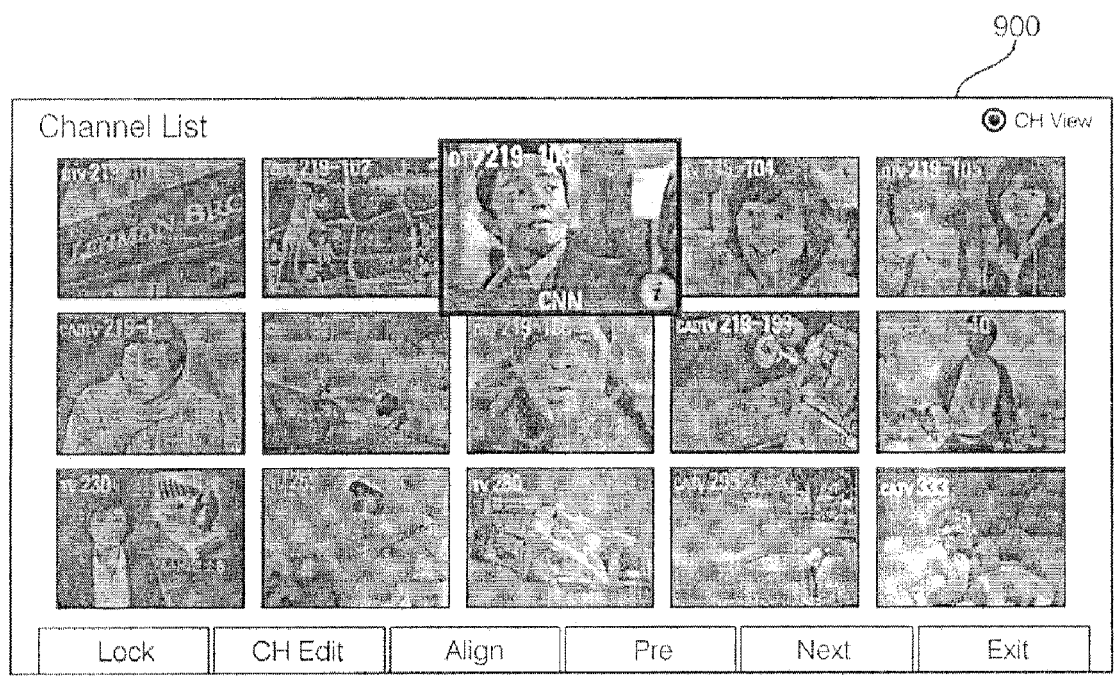

[FIG. 11]
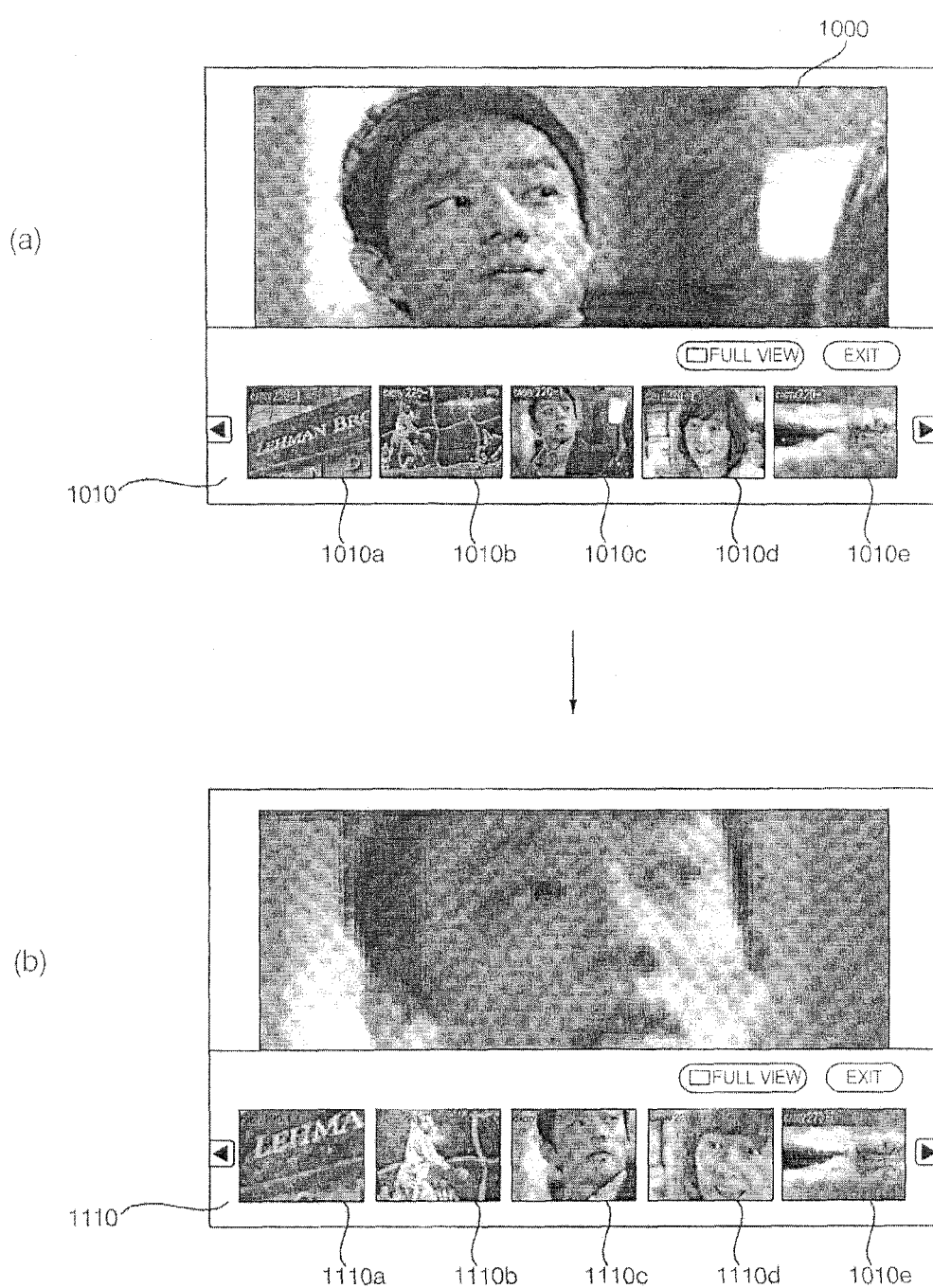

IMAGE DISPLAY APPARATUS AND OPERATING METHOD THEREOF

CROSS-REFERENCE TO RELATED APPLICATION

This application claims the priority benefit of Korean Patent Application No. 2009-0048754, filed Jun. 2, 2009, respectively, in the Korean Intellectual Property Office, the disclosure of which is incorporated herein by reference.

BACKGROUND

1. Field

One or more embodiments described herein relate to displaying images.

2. Background

Digital broadcasting offer many advantages over analog broadcasting such as robustness against noise, no or little data loss, ease of error correction, and the ability to provide for high-definition viewing. Digital broadcasting also has allowed interactive services to be offered to customers. However, as the number of channels increase, it is becoming more difficult for viewers to determine what programs they are watching as they switch through channels. It is also difficult for users to identify the source of video signals input to their image display apparatuses especially when peripherals are connected.

BRIEF DESCRIPTION OF THE DRAWINGS

FIGS. 4A and 4B are diagrams showing examples of a remote control device shown in FIG. 1.

FIGS. 5 and 6 are diagrams showing steps included in one embodiment of an operating method of an image display apparatus.

FIG. 7 is a diagram showing one example of how a thumbnail image may be extracted in the operating method shown in FIG. 5.

FIG. 8 is a diagram showing steps included in another embodiment of an operating method of an image display apparatus.

FIG. 9 is a diagram of a screen that explains one example of the operation of the channel-browsing processor of FIG. 3.

FIG. 10 is a diagram of a screen that explains another example of the operation of the channel-browsing processor of FIG. 3.

FIGS. 11(a) and 11(b) are diagrams which explain how a thumbnail image may be updated when a channel list is displayed.

DETAILED DESCRIPTION

Figure 1:
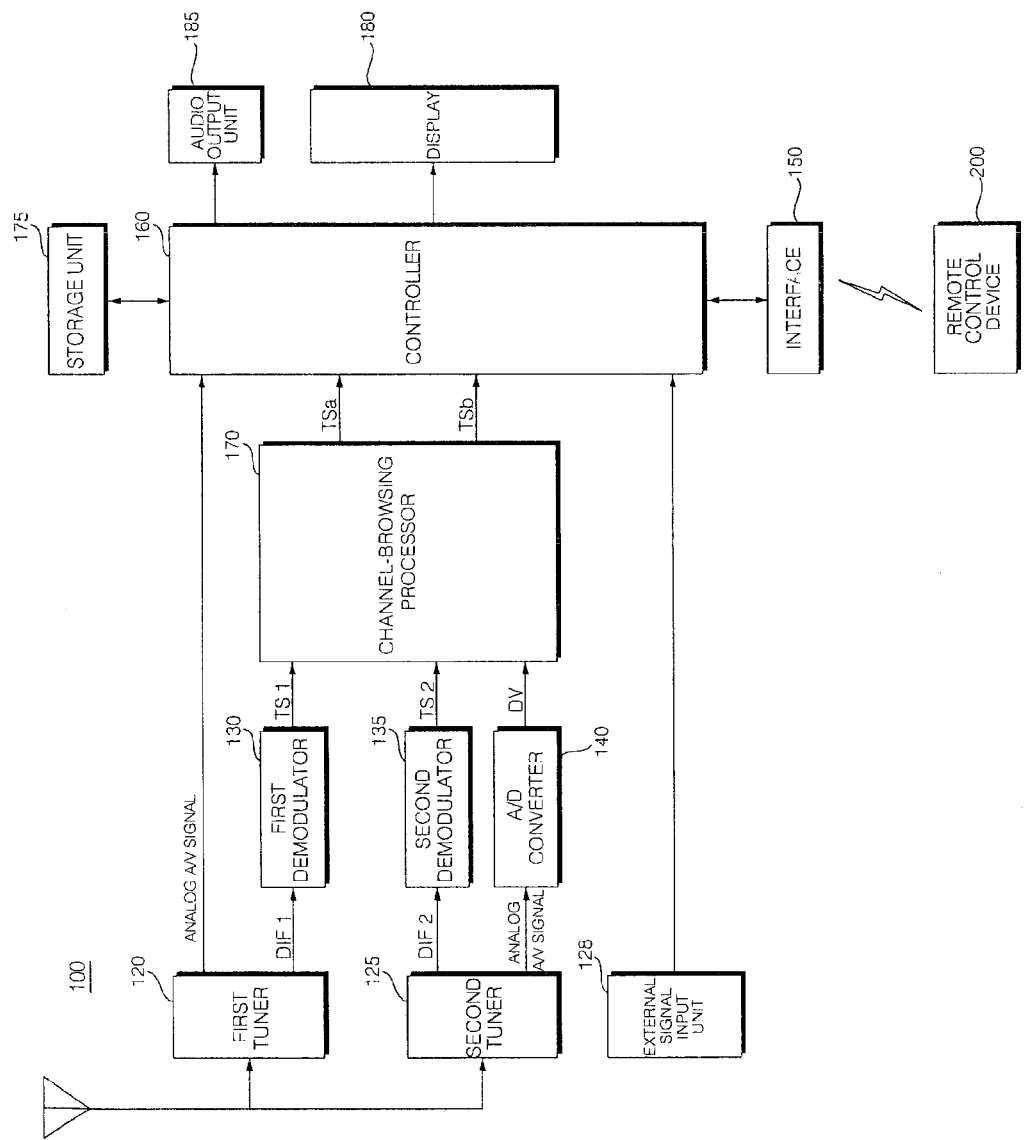
FIG. 1 is a diagram of one embodiment of an image display apparatus.

FIG. 1 shows one embodiment of an image display apparatus 100, which includes a first tuner 120, a second tuner 125, an external signal input unit 128, a first demodulator 130, a second demodulator 135, an analog-to-digital (A/D) converter 140, an interface 150, a controller 160, a channel-browsing processor 170, a storage unit 175, a display 180, and an audio output unit 185.

The first tuner 120 may choose a radio frequency (RF) broadcast signal corresponding to a channel chosen by a user from a plurality of RF broadcast signals received via an antenna and may convert the chosen RF broadcast signal into a digital intermediate-frequency (IF) signal or an analog baseband A/V signal.

More specifically, if the chosen RF broadcast signal is a digital broadcast signal, the first tuner 120 may convert the chosen RF broadcast signal into a first digital IF signal DIF 1. On the other hand, if the chosen RF broadcast signal is an analog broadcast signal, the first tuner 120 may convert the chosen RF broadcast signal into an analog baseband A/V signal CVBS 1/SIF. That is, the first tuner may be a hybrid tuner capable of processing not only digital broadcast signals but also analog broadcast signals. The analog baseband A/V signal CVBS1/SIF may be directly input to the controller 160.

The first tuner 120 may be able to receive RF broadcast signals from an Advanced Television Systems Committee (ATSC) single-carrier system or from a Digital Video Broadcasting (DVB) multi-carrier system.

The second tuner 125, like the first tuner, may choose the RF broadcast signal corresponding to the channel chosen from all the plurality of RF signals received through the antenna, and may convert the chosen RF broadcast signal into a second digital IF signal DIF 2 or an analog baseband A/V signal CVBS 2/SIF.

In addition, the second tuner may sequentially or periodically choose a number of RF broadcast signals respectively corresponding to a number of channels previously added to the image display apparatus 100 by a channel-add function from a plurality of RF signals received through the antenna, and may convert the chosen RF broadcast signals into IF signals or baseband A/V signals. In this exemplary embodiment, one or more video frames acquired from each of the previously-added channels may be displayed on the display 180 as thumbnail images. Thus, it is possible to receive the RF broadcast signals respectively corresponding to the previously-added channels sequentially or periodically.

For example, the first tuner 120 may convert a main RF broadcast signal chosen by the user into an IF signal or a baseband A/V signal, and the second tuner 125 may sequentially or periodically choose all other RF broadcast signals (i.e., sub-RF broadcast signals) and may convert the chosen RF broadcast signals into IF signals or baseband A/V signals.

The first demodulator 130 may receive the first digital IF signal DIF 1 from the first tuner 120 and may demodulate the first digital IF signal DIF 1.

For example, if the first digital IF signal DIF 1 is an ATSC signal, the first demodulator 130 may perform 8-vestigal sideband (VSB) demodulation on the first digital IF signal DIF 1. The first demodulator may perform channel decoding. For this, the first demodulator may include a Trellis decoder (not shown), a de-interleaver (not shown) and a Reed-Solomon decoder (not shown) and may thus be able to perform Trellis decoding, de-interleaving and Reed-Solomon decoding.

For example, if the first digital IF signal DIF 1 is a DVB signal, first demodulator 130 may perform coded orthogonal frequency division modulation (COFDMA) demodulation on the first digital IF signal DIF 1. The first demodulator may perform channel decoding. For this, the first demodulator may include a convolution decoder (not shown), a de-interleaver (not shown), and a Reed-Solomon decoder (not shown) and may thus be able to perform convolution decoding, de-interleaving and Reed-Solomon decoding.

The external signal input unit 128 may receive signals from an external device. For this, the external signal input unit may include an A/V input/output (I/O) module (not shown) and a wireless communication module (not shown).

The external signal input unit may be connected to an external device such as a digital versatile disc (DVD), a Blu-ray disc, a gaming device, a camcorder, or a computer (e.g., a laptop computer). Then, the external signal input unit may receive various external input video, audio, and/or data signals from the external device and may transmit the received external input signals to controller 160. In addition, external signal input unit 128 may output various video, audio and data signals processed by the controller 160 to the external device.

In order to receive A/V signals from or transmit A/V signals to an external device, the A/V I/O module of the external signal input unit 128 may include an Ethernet port, a universal serial bus (USB) port, a composite video banking sync (CVBS) port, a component port, a super-video (S-video) (analog) port, a digital visual interface (DVI) port, a high-definition multimedia interface (HDMI) port, a red-green-blue (RGB) port, a D-sub port, an Institute of Electrical and Electronics Engineers (IEEE)-1394 port, a Sony/Philips Digital Interconnect Format (S/PDIF) port, and a liquidHD port.

Various input signals received by the external signal input unit 128 may be input to channel-browsing processor 170 and may thus be subjected to a channel-browsing operation performed by channel-browsing processor 170 for extracting a number of thumbnail images. For example, analog signals received through the CVBS port and the S-video port may be converted into digital signals by the A/D converter 140, and the digital signals may be input to the channel-browsing processor 170.

Digital signals received through the Ethernet port, the USB port, the component port, the DVI port, the HDMI port, the RGB port, the D-sub port, the IEEE-1394 port, the S/PDIF port and the liquidHD port may be directly input to the channel-browsing processor 170 without the need to be digitalized. A digital signal output by the external signal input unit 128 may be a stream signal, for example, an MPEG-2 transport stream (TS) obtained by multiplexing an MPEG-2 video signal and a Dolby AC-3 audio signal.

The wireless communication module may wirelessly access the internet. For this, the wireless communication module may use a wireless local area network (WLAN) (i.e., Wi-Fi), Wireless broadband (Wibro), World Interoperability for Microwave Access (Wimax), and High Speed Downlink Packet Access (HSDPA).

In addition, the wireless communication module may perform short-range wireless communication with other electronic devices. For this, the wireless communication module may use Bluetooth, radio-frequency identification (RFID), Infrared Data Association (IrDA), Ultra Wideband (UWB), and ZigBee.

The external signal input unit 128 may be connected to various set-top boxes through at least one of the Ethernet port, the USB port, the CVBS port, the component port, the S-video port, the DVI port, the HDMI port, the RGB port, the D-sub port, the IEEE-1394 port, the S/PDIF port, and the liquidHD port and may thus receive data from or transmit data to the various set-top boxes.

For example, when connected to an Internet Protocol Television (IPTV) set-top box, the external signal input unit 128 may transmit video, audio and data signals processed by the IPTV set-top box to the controller 160 and may transmit various signals provided the controller 160 to the IPTV set-top box. In addition, video, audio and data signals processed by the IPTV set-top box may be processed by the channel-browsing processor 170 and then the controller 160.

The term 'IPTV', as used herein, may cover a broad range of services such as ADSL-TV, VDSL-TV, FTTH-TV, TV over DSL, Video over DSL, TV over IP (TVIP), Broadband TV (BTV), and Internet TV and full-browsing TV, which are capable of providing Internet-access services.

The first demodulator 130 may perform demodulation and channel decoding on the first digital IF signal DIF 1 provided by the first tuner 120, thereby obtaining a first stream signal TS 1. The first stream signal TS 1 may be a signal obtained by multiplexing a video signal, an audio signal and a data signal. For example, the first stream signal TS 1 may be an MPEG-2 TS signal obtained by multiplexing an MPEG-2 video signal and a Dolby AC-3 audio signal. An MPEG-2 TS signal may include a 4-byte header and a 184-byte payload.

The first stream signal TS 1 may be input to the controller 160 and may thus be subjected to demultiplexing and signal processing. In this exemplary embodiment, the first stream signal TS 1 may be input to the channel-browsing processor 170 and may thus be subjected to processes for channel-browsing before input to the controller 160. A channel-browsing operation will be described in greater detail below.

In order to properly handle not only ATSC signals but also DVB signals, the first demodulator 130 may include an ATSC demodulator and a DVB demodulator.

The second demodulator 135 may receive the second digital IF signal DIF 2 from the second tuner 125 and may demodulate the second digital IF signal DIF 2, thereby generating a second stream signal TS 2. The operation of the second demodulator is almost the same as the operation of the first demodulator.

An analog baseband video signal CVBS 2 output by the second tuner 125 may need to be digitalized by the A/D converter 140.

The A/D converter 140 may convert an analog signal input thereto into a digital signal. If the input analog signal is a video signal, the A/D converter may perform sampling and quantization on the input analog signal, thereby obtaining the digital video signal DV. The digital video signal DV may be a signal yet to be encoded. The digital video signal DV may be input to channel-browsing processor 170 and may thus be processed by the channel-browsing processor.

The interface 150 may transmit a signal provided by the user to the controller 160 or transmit a signal provided by the controller to the user. For example, the interface may receive various user input signals such as a power-on/off signal, a channel-selection signal, and a channel-setting signal from a remote control device 200 or may transmit a signal provided by controller 160 to remote control device 200.

The controller 160 may demultiplex an input stream into a number of signals and may process the signals obtained by the demultiplexing so that the processed signals can be output as A/V data. The controller may control the general operation of the image display apparatus 100.

The controller 160 may include a demultiplexer (not shown), a video processor (not shown), an audio processor (not shown), and a user input processor (not shown).

The controller may demultiplex an input stream signal, e.g., an MPEG-2 TS signal, into a video signal, an audio signal and a data signal. Thereafter, the controller may process the video signal. For example, if the video signal is an encoded signal, controller 160 may decode the video signal. More specifically, if the video signal is an MPEG-2 encoded signal, the controller may decode the video signal by performing MPEG-2 decoding. On the other hand, if the video signal is an H.264-encoded DMB or DVB-handheld (DVB-H) signal, controller 160 may decode the video signal by performing H.264 decoding. In addition, the controller may adjust the brightness, tint or color of the video signal.

The video signal processed by the controller may be input to display 180 and may thus be displayed by the display. Alternatively, the video signal processed by controller 160 may be input to an external output port which is connected to an external output device.

The controller 160 may process the audio signal obtained by demultiplexing the input stream signal. For example, if the audio signal is an encoded signal, the controller may decode the audio signal. More specifically, if the audio signal is an MPEG-2 encoded signal, the controller may decode the audio signal by performing MPEG-2 decoding. On the other hand, if the audio signal is an MPEG-4 Bit Sliced Arithmetic Coding (BSAC)-encoded terrestrial DMB signal, the controller 160 may decode the audio signal by performing MPEG-4 decoding. On the other hand, if the audio signal is an MPEG-2 Advanced Audio Coding (AAC)-encoded DMB or DVB-H signal, the controller 180 may decode the audio signal by performing AAC decoding. In addition, the controller may adjust the base, treble or sound volume of the audio signal.

The audio signal processed by the controller 160 may be input to the audio output unit 185, e.g., a speaker, and may thus be output by the audio output unit. Alternatively, the audio signal processed by the controller may be input to an external output port which is connected to an external output device.

The controller 160 may process the data signal obtained by demultiplexing the input stream signal. For example, if the data signal is an encoded signal such as an electronic program guide (EPG), which is a guide to scheduled broadcast TV or radio programs, the controller may decode the data signal. Examples of an EPG include ATSC-Program and System Information Protocol (PSIP) information and DVB-Service Information (SI). ATSC-PSIP information or DVB-SI information may be included in the header of a TS, i.e., a 4-byte header of an MPEG-2 TS.

The controller may perform on-screen display (OSD) processing. More specifically, controller 160 may generate an OSD signal for displaying various information on the display device as graphic or text data based on a user input signal provided by the remote control device 200 and at least one of a processed video signal and a processed data signal. The OSD signal may be input to the display along with the processed video signal and the processed data signal.

The OSD signal may include various data such as a user-interface (UI) screen for the image display apparatus 100 and various menu screens, widgets, and icons.

The channel-browsing processor 170 may perform channel browsing on a plurality of broadcast signals respectively corresponding to a plurality of received channels, various input image signals input thereto from the external signal input unit 128, or both. More specifically, the channel-browsing processor may receive the first or second stream signal TS 1 or TS 2 from the first or second demodulator 130 or 135, a stream signal from the external signal input unit 128 or the digital signal DV from the A/D converter 140, may demultiplex the first or second stream signal TS 1 or TS 2, and may extract some of the frames of a video signal obtained by the demultiplexing.

Thereafter, the channel-browsing processor may generate a new TS signal, i.e., a sub-stream signal TSa, by multiplexing a video signal including the extracted video frames. For example, the sub-stream signal TSa and a main-stream signal TSb may both be MPEG-2 TS signals. The channel-browsing processor may output the main-stream signal TSb, which corresponds to a main video signal to be displayed in a main region on the display, as is without any modifications. On the other hand, channel-browsing processor 170 may perform channel browsing on a sub-video signal, which is to be displayed in a sub-region on display 180, thereby obtaining the sub-stream signal TSa.

In this exemplary embodiment, channel-browsing processor 170 may extract some of the video frames of each of a plurality of broadcast signals received from a plurality of channels and may re-encode the extracted video frames into a TS, thereby displaying a list of the channels on display 180. Since the extracted video frames are displayed on the display as thumbnail images, the user may intuitively identify the content of broadcast programs received from the plurality of channels.

Likewise, the channel-browsing processor may extract some of the video frames of each of various external input signals provided by the external signal input unit 128 and may re-encode the extracted video frames into a stream, thereby displaying an external input image list on the display 180. In this manner, a list of a plurality of external input image signals provided by various external input devices may be displayed on the display as thumbnail images. Therefore, the user may intuitively identify the external input signals provided by the various external input devices based on the external input image list. The structure and operation of the channel-browsing processor 170 will be described later in further detail with reference to FIG. 2.

The storage unit 175 may store various program for processing and controlling various signals, and may also store processed video, audio and data signals.

The storage unit 175 may temporarily store a video, audio or data signal provided by the external signal input unit 128.

The storage unit 175 may store various broadcast channels using a channel-add function. The storage unit may include, for example, at least one of a flash memory-type storage medium, a hard disc-type storage medium, a multimedia card micro-type storage medium, a card-type memory, a random access memory (RAM) and a read-only memory (ROM) such as an electrically erasable programmable ROM (EEPROM).

The storage unit 175 is shown in FIG. 1 as being separate from the controller 160. However, variations are possible. For example, the storage unit 175 may be incorporated into the controller 160.

The image display apparatus 100 may play a file (such as a moving-image file, a still-image file or a document file) present in the storage unit 175 and may present the file to the user.

The display 180 may convert a processed video signal, a processed data signal, and an OSD signal provided by the controller 160 or a video signal and a data signal provided by the external signal input unit 128 into RGB signals, thereby generating driving signals. The display may be implemented into various types of displays such as a plasma display panel, a liquid crystal display (LCD), an organic light-emitting diode (OLED), a flexible display, and a three-dimensional (3D) display. The display may also be implemented as a touch screen and may thus be used not only as an output device but also as an input device.

The audio output unit 185 may receive a processed audio signal (e.g., a stereo signal, a 3.1-channel signal or a 5.1-channel signal) from the controller 160 and may output the received audio signal. The audio output unit 185 may be implemented into various types of speakers.

The remote control device 200 may transmit user input to the interface 150. For this, the remote control device 200 may use various communication techniques such as Bluetooth, RF, IR, UWB and ZigBee.

In addition, the remote control device 200 may receive a video signal, an audio signal and a data signal from the interface 150 and may output the received signals. The remote control device 200 may be a spatial remote control. A spatial remote control will be described in greater detail with reference to FIG. 3.

The image display apparatus 100 is shown in FIG. 1 as being equipped with two tuners. However, variations are possible. For example, the image display apparatus may include only one tuner. In this case, the image display apparatus may receive a broadcast signal from a channel chosen by the user with the use of the tuner. Then, if an 'channel list' menu is selected, the image display apparatus may sequentially or periodically receive broadcast signals from all broadcast channels stored in advance with the use of a channel-add function. Then, a list of the previously-added channels may be displayed in a full-view mode in response to a command to display a channel list in full view.

The image display apparatus may be a fixed digital broadcast receiver capable of receiving at least one of ATSC (8-VSB) broadcast programs, DVB-T (COFDM) broadcast programs, and ISDB-T (BST-OFDM) broadcast programs or may be a mobile digital broadcast receiver capable of receiving at least one of terrestrial DMB broadcast programs, satellite DMB broadcast programs, ATSC-M/H broadcast programs, DVB-H (COFDM) broadcast programs, and Media Forward Link Only (MediaFLO) broadcast programs. Alternatively, the image display apparatus 100 may be a digital broadcast receiver capable of receiving cable broadcast programs, satellite broadcast programs or IPTV programs.

Examples of the image display apparatus 100 include a TV receiver, a mobile phone, a smart phone, a laptop computer, a digital broadcast receiver, a personal digital assistant (PDA) and a portable multimedia player (PMP).

Figure 2:
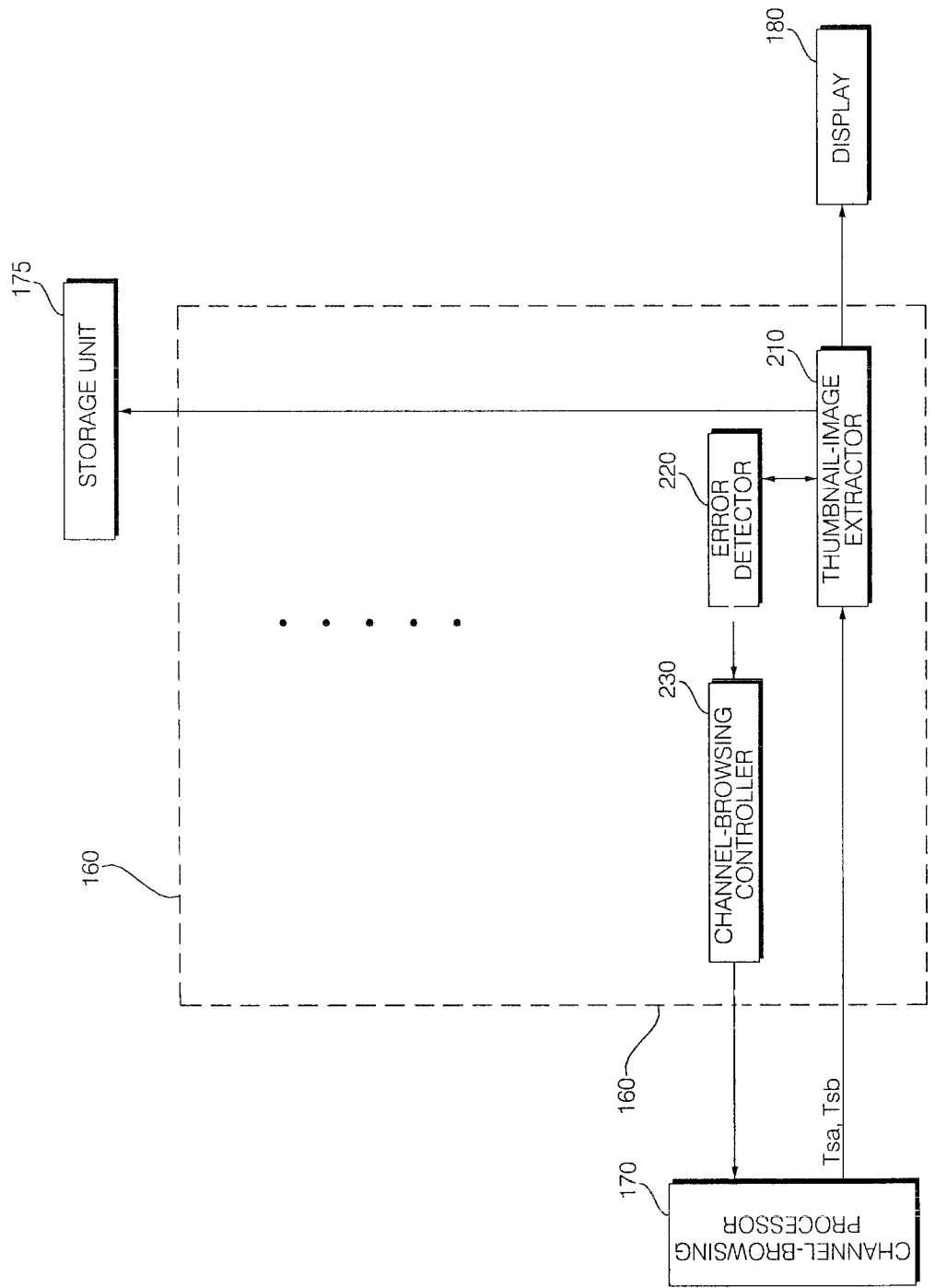
FIG. 2 is a diagram of a controller as shown in FIG. 1.

FIG. 2 shows an example of controller 160 in FIG. 1. The controller includes a thumbnail-image extractor 210, an error detector 220 and a channel-browsing controller 230. The controller may also include a videos signal processor (not shown) and an audio signal processor (not shown).

An error may occur in a thumbnail image processed by channel-browsing processor 170, for example, during the transmission of the thumbnail image to the controller 160. Therefore, it is necessary to stably process thumbnail images.

The thumbnail-image extractor 210 may extract a thumbnail image corresponding to an input signal. For example, if a primitive thumbnail image corresponding to an input signal is acquired by channel-browsing processor 170 and is then encoded into a thumbnail stream and the stream is transmitted to controller 160, the thumbnail-image extractor may extract a thumbnail image from the thumbnail stream. For this, the thumbnail-image extractor may demultiplex the thumbnail stream, and may parse the demultiplexed thumbnail stream, thereby extracting part of a thumbnail image.

The input signal may include at least one of a broadcast image signal received from a channel and an external input image signal provided by an external input device.

The thumbnail-image extractor 210 may control a thumbnail-image list including the extracted thumbnail image to be displayed on the display 180.

The error detector 220 may determine whether the extracted thumbnail image provided by thumbnail-image extractor 210 is erroneous. An erroneous thumbnail image may be displayed on display 180 as being broken. In order to address this problem, error detector 220 may examine at least one of size information, syntax information, checksum information, continuity information and content information of the extracted thumbnail image provided by the thumbnail-image extractor.

If the extraction of a thumbnail image is performed in units of packets by thumbnail-image extractor 210, error detector 220 may examine size information, syntax information, checksum information, continuity information and/or content information of each packet of the extracted thumbnail image provided by the thumbnail-image extractor. If the extracted thumbnail image provided by the thumbnail-image extractor consists of a plurality of consecutive packets, the continuity between the consecutive packets of the extracted thumbnail image provided by the thumbnail-image extractor may be examined by examining information indicating the sequence in the consecutive packets of the extracted thumbnail image provided by the thumbnail-image extractor, for example, a packet-sequence bit of the extracted thumbnail image provided by the thumbnail-image extractor.

In order to examine the content information of the extracted thumbnail image provided by the thumbnail-image extractor 210, at least part of the extracted thumbnail image provided by the thumbnail-image extractor may be temporarily decoded, and it may be determined whether the decoded thumbnail image is erroneous.

If the extracted thumbnail image provided by the thumbnail-image extractor is determined not to be erroneous, error detector 220 may transmit a control signal to the thumbnail-image extractor, and may thus control a thumbnail-image list including the extracted thumbnail image provided by the thumbnail-image extractor to be displayed on the display.

On the other hand, if the extracted thumbnail image provided by the thumbnail-image extractor 210 is determined to be erroneous, the error detector may transmit a control signal to the thumbnail-image extractor, and may thus terminate the updating of the extracted thumbnail image provided by the thumbnail-image extractor or the extraction of a new thumbnail mage.

The channel-browsing controller 230 may control the channel-browsing processor 170 to operate in response to user input received via the interface 150. For example, if a command to display a channel list is issued, the channel-browsing controller may control the channel-browsing processor to acquire a thumbnail image corresponding to a broadcast image signal received from a channel.

In addition, the channel-browsing controller may terminate the updating of a thumbnail image by the channel-browsing processor if error detector 220 detects an error from the thumbnail image. Moreover, the channel-browsing controller may control a thumbnail-image list (or screen) including one or more thumbnail images acquired by the thumbnail-image extractor 210 to be displayed on display 180.

The storage unit 175 may store one or more thumbnail images acquired by the thumbnail-image extractor 210. Then, the thumbnail images stored in the storage unit may be displayed on the display in response to the reception of a command to display a channel list via the interface 150.

The thumbnail-image extractor, error detector, and channel-browsing controller are shown in FIG. 2 as being included in controller 160. However, variations are possible. For example, the thumbnail-image extractor, the error detector and channel-browsing controller may be implemented as separate modules from the controller or may be incorporated into one or two modules.

Figure 3:
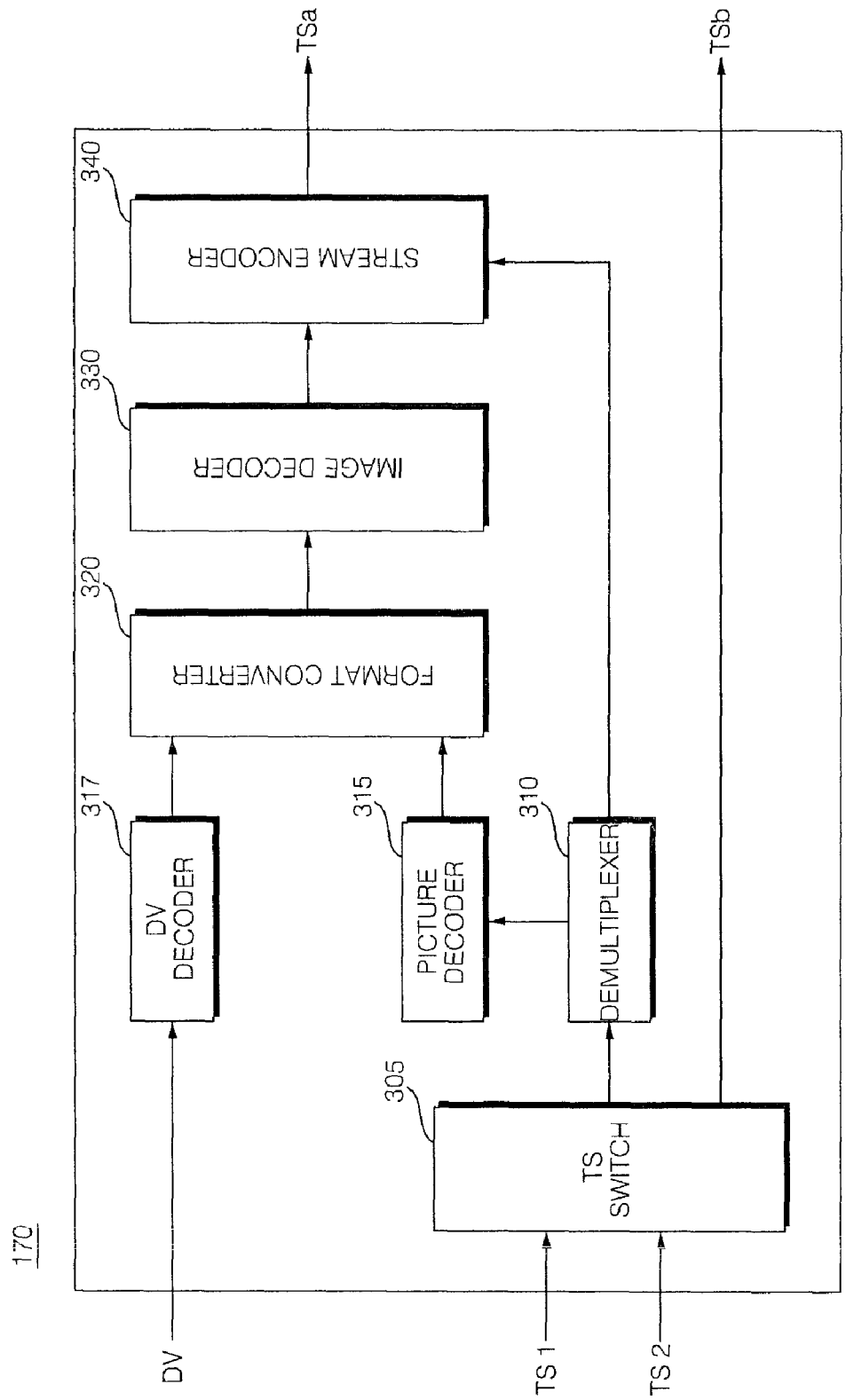
FIG. 3 is a diagram of a channel-browsing processor as shown in FIG. 1.

FIG. 3 shows a example of the channel-browsing processor 170 in FIG. 1. The channel-browsing processor may include a TS switch 305, a demultiplexer 310, a picture decoder 315, a DV decoder 317, a format converter 320, an image encoder 330 and a stream encoder 340.

The TS switch 305 may choose one of the first and second stream signals TS 1 and TS 3, may output the chosen stream signal as the main-stream signal TSb without any modifications, and may transmit the other stream signal to demultiplexer 310 as sub-stream signal. The main-stream signal, which corresponds to a main-video signal, may be displayed on the entire display. The sub-stream signal, which corresponds to sub-video signal, may be displayed only on a certain part of the display.

In this manner, a channel list, an external input image list or both may be displayed in a compact view in a certain area on the display.

The demultiplexer 310 may demultiplex the first or second stream signal TS 1 or TS 2 into a video signal, an audio signal and a data signal, may transmit the video signal to picture decoder 315 and may transmit the audio signal and the data signal to the stream encoder 340 in order for the stream encoder 340 to generate a new stream signal.

The picture decoder 315 may receive the video signal obtained by the demultiplexing performed by demultiplexer 310 and may decode at least some of the frames of the received video signal by performing MPEG-2 decoding, MPEG-4 decoding or H.264 decoding. The decoded frames may be still images or moving images. For example, the picture decoder may decode an intra-coded (I) frame or some section of the received video signal.

The DV decoder 317 may receive the digital signal DV from the A/D converter 140, and may acquire a digital image signal from the digital signal DV.

The format converter 320 may convert the format of a video signal input thereto from the picture decoder 315 or the DV decoder 317. For example, the format converter may change the size (or resolution) of the input image signal and may thus enable the input image signal to be displayed on the display as a thumbnail image with an appropriate size.

The format converter may convert the input image signal to different sizes according to whether the input image signal is to be displayed in a compact-view mode or in a full-view mode. The size of thumbnail images displayed in a full-view mode may be greater than the size of thumbnail images displayed in a compact-view mode. A channel list, an external input image list or both may be displayed on the display either in a compact-view mode or in a full-view mode.

The image encoder 330 may encode an image signal provided by the format converter 320 by performing JPEG encoding or MPEG-2 encoding. Still images or moving images encoded by the image encoder 330 may be displayed on the display as thumbnail images.

The stream encoder may re-encode or multiplex an encoded video signal provided by image encoder 330, the audio and data signals obtained by the multiplexing performed by the demultiplexer 310 into a stream, for example, an MPEG-2 TS.

In this exemplary embodiment, the channel-browsing processor 170 may extract some of the video frames of each of a plurality of broadcast signals and a plurality of external input signals and may re-encode the extracted video frames. Then, the re-encoded images may be displayed on the display as thumbnail images in response to user input requesting the display of a channel list or an external input image list. In this manner, the user may intuitively identify the content of broadcast programs received from various channels or external input signals provided by various external input devices.

FIGS. 4A and 4B show examples of the remote control device 200 in FIG. 1, which, for example, may be a spatial remote control 401. In operation, the spatial remote control 401 may transmit RF signals to or receive RF signals from the image display apparatus according to the RF communication standard. A pointer 402 representing the movement of the spatial remote control 401 may be displayed on the image display apparatus.

The user may move the spatial remote control 401 up and down, back and forth and side to side or may rotate the spatial remote control 401. The pointer 402 may move in accordance with the movement of the spatial remote control 401, as shown in FIG. 4B.

Referring to FIG. 4A, if the user moves the spatial remote control 401 to the left, the pointer 402 may move to the left accordingly. The spatial remote control may include a sensor capable of detection motion. The sensor of the spatial remote control 401 may detect the movement of the spatial remote control and may transmit motion information corresponding to the results of the detection to the image display apparatus.

Then, the image display apparatus may determine the movement of the spatial remote control based on the motion information provided by the spatial remote control, and may calculate the coordinates of a target point to which pointer 402 should be shifted in accordance with the movement of spatial remote control 401 based on the results of the determination.

Referring to FIGS. 4A and 4B, pointer 402 may move according to whether the spatial remote control 401 moves vertically or horizontally or rotates. The moving speed and direction of the pointer may correspond to the moving speed and direction of the spatial remote control.

In this exemplary embodiment, pointer 402 may move in accordance with the movement of spatial remote control 401. Alternatively, an operation command may be input to the image display apparatus 100 in response to the movement of the spatial remote control. That is, as the spatial remote control moves back and forth, an image displayed on the image display apparatus may be gradually enlarged or reduced.

FIGS. 5 and 6 show steps included in one embodiment of an operating method of an image display apparatus. Referring to FIG. 5, a thumbnail image corresponding to an input image signal may be extracted (S500). The input image signal may be a broadcast image signal received from a channel or an external input image signal provided by an external input device.

The extraction of the thumbnail image corresponding to the input image signal may be performed by the thumbnail-image extractor 210. The thumbnail image corresponding to the input image signal may be stored in the storage unit 175 for later display on the display.

Thereafter, it may be determined whether the thumbnail image corresponding to the input image signal is erroneous (S560). More specifically, at least one of size information, syntax information, checksum information, continuity information and content information of the thumbnail image corresponding to the input image signal may be examined in order to determine whether the thumbnail image corresponding to the input image signal is erroneous.

If the thumbnail image corresponding to the input image signal is determined not to be erroneous (S570), a thumbnail-image list (or screen) including the thumbnail image corresponding to the input image signal may be displayed on the display 180 (S580). On the other hand, if the thumbnail image corresponding to the input image signal is determined not to be erroneous (S570), the operating method returns to operation S500.

The thumbnail-image list including the thumbnail image corresponding to the input image signal may be displayed on the display 500 in response to a user command received via the interface 150 before operation S500, after operation S500 or S560 or during operation S560.

Referring to FIG. 6, an updated thumbnail image of the thumbnail image corresponding to the input image signal may be extracted (S600). Thereafter, it may be determined whether the updated thumbnail image is erroneous (S660). If the updated thumbnail image is determined not to be erroneous (S670), a thumbnail-image list (or screen) including the updated thumbnail image may be displayed on the display 180 (S680).

On the other hand, if the updated thumbnail image is determined to be erroneous (S670), a command to terminate the updating of the thumbnail image corresponding to the input image signal may be issued (S690). As a result, the extraction of the updated thumbnail image may be terminated. Thereafter, the operating method returns to operation S600.

Operation S600 is illustrated as being performed after operation S580 of FIG. 5, but the present invention is not restricted to this. Operation S600 may be performed at any time after operation S500. That is, a thumbnail image and then an updated thumbnail image of the thumbnail image may be extracted, and then it may be performed whether the thumbnail image and the updated thumbnail image are erroneous.

The updating of the thumbnail image corresponding to the input image signal may be performed by the channel-browsing processor 170 either periodically or randomly.

FIG. 7 shows an example of how a thumbnail image may be extracted in accordance with the operating method in FIG. 5. Referring to FIG. 7, an input stream corresponding to an input signal may be demultiplexed (S710). The input signal may be a broadcast signal received from a channel or an external input signal provided by an external input device.

More specifically, the input signal may be a digital signal and may be input to the channel-browsing processor 170 as a transport stream. Thereafter, the input signal may be demultiplexed into a video signal, an audio signal and a data signal by the demultiplexer 310 of the channel-browsing processor.

Thereafter, a primitive thumbnail image may be acquired from the demultiplexed input stream (S715). More specifically, the video signal obtained by the demultiplexing performed in operation S710 may be decoded by the picture decoder 315 shown in FIG. 3. Thereafter, the format of the decoded video signal, and particularly, the size of the decoded video signal, may be converted by the format converter 320 shown in FIG. 3. As a result, an appropriate-size thumbnail image may be able to be displayed on the display.

Thereafter, the acquired primitive thumbnail image may be encoded into a thumbnail stream (S720). For example, the acquired primitive thumbnail image may be JPEG- or MPEG 2-encoded by the image encoder 330 shown in FIG. 3.

The encoded primitive thumbnail image may be multiplexed into a stream alone or together with the audio and data signals obtained by the demultiplexing performed in operation S710. The stream obtained by multiplexing the encoded primitive thumbnail image may be a MPEG-2 TS by the stream encoder 330 shown in FIG. 3.

Thereafter, a thumbnail image may be acquired from the thumbnail stream obtained in operation S720 (S725). More specifically, the thumbnail-image extractor 210 may demultiplex and then parse the thumbnail stream obtained in operation S720, thereby extracting at least part of a thumbnail image. Thereafter, the thumbnail-image extractor 210 may restore a thumbnail image based on the results of the extraction.

If the input signal is a broadcast signal, the reception of the broadcast signal from a channel selected by the user and then the acquirement of a stream from the broadcast signal may be performed before operation S710. The reception of the broadcast signal from the channel selected by the user may be performed by first and second tuners 120 and 125, and the acquirement of a stream from the broadcast signal may be performed by the first and second demodulators 130 and 135.

FIG. 8 shows steps included in another embodiment of an operating method of an image display apparatus. The exemplary embodiment of FIG. 8 is similar in some respects to the exemplary embodiment of FIG. 5; however, there are some differences.

Referring to FIG. 8, a thumbnail image corresponding to an input image signal may be extracted (S750). The input image signal may be a broadcast image signal received from a channel or an external input image signal provided by an external input device. The extraction of the thumbnail image corresponding to the input image signal may be performed by thumbnail-image extractor 210. The thumbnail image corresponding to the input image signal may be stored in storage unit 175 for later display on the display 180.

Thereafter, it may be determined whether the thumbnail image corresponding to the input image signal is erroneous (S760). More specifically, at least one of size information, syntax information, checksum information, continuity information and content information of the thumbnail image corresponding to the input image signal may be examined in order to determine whether the thumbnail image corresponding to the input image signal is erroneous.

More specifically, it may be determined whether to display the thumbnail image corresponding to the input image signal based on at least one of the size (hereinafter referred to as the error size) of an erroneous part of the thumbnail image corresponding to the input image signal and the ratio (hereinafter referred to as the error ratio) of the size of the erroneous part of the thumbnail image corresponding to the input image signal to the whole thumbnail image corresponding to the input image signal.

For example, if the error size of the thumbnail image corresponding to the input image signal is less than a first reference value, the thumbnail image corresponding to the input image signal may be chosen to be displayed on the display 180 regardless of the occurrence of an error in the thumbnail image corresponding to the input image signal.

On the other hand, if the error size of the thumbnail image corresponding to the input image signal is greater than the first reference value, the operating method returns to operation S750 Likewise, if the error ratio of the thumbnail image corresponding to the input image signal is less than a reference value is less than a second reference value, the thumbnail image corresponding to the input image signal may be chosen to be displayed on the display 180 regardless of the occurrence of an error in the thumbnail image corresponding to the input image signal.

On the other hand, if the error ratio of the thumbnail image corresponding to the input image signal is greater than the second reference value, the operating method returns to operation S750. The second reference value may be set differently for a compact-view mode and a full-view mode.

If the thumbnail image corresponding to the input image signal is determined not to be erroneous (S770), a thumbnail-image list (or screen) including the thumbnail image corresponding to the input image signal may be displayed on the display 180 (S780).

In the exemplary embodiment of FIG. 8, like in the exemplary embodiments of FIGS. 5 and 6, the updating of the thumbnail image corresponding to the input image signal may be performed. In this case, in operation S775, it may be determined whether to display an updated thumbnail image of the thumbnail image corresponding to the input image signal based on at least one of the error size and the error ratio of the updated thumbnail image.

Operation S750 may be performed as shown in FIG. 7.

FIG. 9 shows a screen that explains an example of the operation of the channel-browsing processor 170 in FIG. 3. Referring to FIG. 5, if a command to display a channel list is issued, a thumbnail-image list (or screen) 810 including a plurality of thumbnail images respectively corresponding to a plurality of broadcast image signals received from various channels received by the image display apparatus 100 may be displayed on the display 180.

The tile of the thumbnail-image list 810, i.e., "Channel List," may be displayed at the top of the display 180. The thumbnail-image list 810 may be displayed in a compact-view mode on one part of the display 180, and a screen 800 may be displayed on the rest of the display 180. The screen 800 may be a menu screen, a broadcast screen, a multimedia-play screen, an external input screen, or a webpage screen.

Therefore, the user may intuitively recognize the content of broadcast programs received from various channels based on the thumbnail-image list 810.

FIG. 10 shows a screen that explains another example of the operation of the channel-browsing processor 170 in FIG. 3. Referring to FIG. 10, a thumbnail-image list (or screen) 900 may be displayed in a full-view mode on the entire display 180. Therefore, the user may intuitively recognize the content of broadcast programs received from various channels based on the thumbnail-image list 900.

The thumbnail-image list 900 may provide an 'edit' menu for editing the thumbnail images displayed in the thumbnail-image list. The 'edit' menu may include various sub-menus such as a 'channel lock' menu for locking a thumbnail image so that the thumbnail image cannot be edited, a 'channel edit' menu for editing thumbnail images, a 'channel align' menu for aligning thumbnail images, a 'pre' menu for navigating to a previous thumbnail-image list to the thumbnail-image list, a 'next' menu for navigating to a next thumbnail-image list to the thumbnail-image list, and an 'exit' for navigating from the 'edit' menu to another menu.

The thumbnail images displayed in the thumbnail-image list may be still images or moving images. The thumbnail images displayed in the thumbnail-image list may be images currently being input to image display apparatus 100 or images previously stored in the image display apparatus.

If one of the thumbnail images displayed in the thumbnail-image list 900 is selected, a broadcast image signal corresponding to the selected thumbnail image may be displayed on the entire display.

If one of the thumbnail images displayed in the thumbnail-image list 900 is brought into focus by, for example, being pointed at by a cursor or a pointer, being highlighted or enlarged, program information regarding a broadcast image signal corresponding to the focused thumbnail image may be displayed.

If one of the thumbnail images displayed in the thumbnail-image list 900 is brought into focus and then the 'edit' menu is selected, a channel providing the broadcast image signal corresponding to the focused thumbnail image may be registered as a favorite channel, may be deleted or may be locked.

The thumbnail-image list 900 may include one or more thumbnail images corresponding to broadcast image signals received from channels previously deleted from image display apparatus 100. The thumbnail images corresponding to the broadcast image signals received from the previously-deleted channels may be displayed in the thumbnail-image list differently from other thumbnail images corresponding to broadcast image signals received from other yet-to-be-deleted channels so as to be able to be easily distinguished.

For example, the thumbnail images corresponding to the broadcast image signals received from the deleted channels may be different from other thumbnail images corresponding to broadcast image signals received from yet-to-be-deleted channels in terms of at least one of brightness, contrast, fade, and transparency.

A plurality of thumbnail images respectively corresponding to a plurality of broadcast image signals may be classified into one or more groups according to their respective channel numbers and whether their respective channels are favorite channels, recently-viewed channels and/or previously-deleted channels, and may be displayed in the thumbnail-image list 900 in units of the groups.

If the 'next' or 'pre' menu is selected from thumbnail-image list 900, a next or previous thumbnail-image list to the thumbnail-image list may be displayed on the display through a drag, scroll, or rotation of the thumbnail-image list. A cursor or a pointer may be freely moved on the thumbnail-image list 900 in response to user input.

The thumbnail images displayed in the thumbnail-image list 900 may be updated either periodically or randomly, and either independently or all together. Each of the thumbnail images displayed in the thumbnail-image list may be updated with one or more new thumbnail images provided by the channel-browsing processor 170.

FIGS. 11(a) and (b) explains how a thumbnail image may be updated when a channel list is displayed. Referring to FIG. 11(a), a channel list may be displayed on the display in a compact-view mode. More specifically, a screen 1000 for displaying a broadcast signal currently being viewed by the user may be displayed on one part of the display, and a thumbnail-image list 1010 including a plurality of thumbnail images 1010a through 1010e may be displayed on the rest of the display.

Referring to FIG. 11(b), one or more of the thumbnail images 1010a through 1010e may be updated. If an error occurs during the updating of a thumbnail image, the updating of the thumbnail image may be terminated, and the thumbnail image may continue to be displayed without updating of the thumbnail image on the display.

Referring to FIGS. 11(a) and 11(b), thumbnail images 1010a through 1010f are updated with thumbnail images 1110a through 1110f, respectively, whereas the thumbnail image 1010e fails to be updated and is thus displayed unchanged on the display 180. In this manner, it is possible to stably display a thumbnail-image list.

The image display apparatus and the operating method of the image display apparatus according to the foregoing embodiments are not restricted to the exemplary embodiments set forth herein. Therefore, variations and combinations of the exemplary embodiments set forth herein may fall within the scope of the present invention.

The operating method of an image display apparatus according to the foregoing embodiments may be implemented as code that can be written on a computer-readable recording medium and can thus be read by a processor. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

According to one or more of the aforementioned embodiments, it is possible to display a thumbnail-image list including a plurality of thumbnail images respectively corresponding to a plurality of broadcast image signals received by an image display apparatus and thus to allow a user to intuitively recognize the broadcast image signals based on the thumbnail-image list.

In addition, it is possible to stably display a thumbnail-image list on a display by determining whether each of a plurality of thumbnail images respectively corresponding to a plurality of broadcast image signals received by an image display apparatus is erroneous.

In addition, if thumbnail images are determined to be erroneous while being updated, the updating of the thumbnail images may be terminated. Thus, it is possible to stably display a thumbnail-image list on a display. Moreover, it is possible to allow a user to utilize various user interfaces even when a thumbnail-image list is displayed.

One or more embodiments described herein provide an image display apparatus and an operating method of the image display apparatus, which can help a user intuitively identify various broadcast signals input to the image display apparatus.

According to one aspect, there is provided an operating method of an image display apparatus, the operating method including extracting a thumbnail image corresponding to an input signal; determining whether the thumbnail image is erroneous; and if the thumbnail image is determined not to be erroneous, displaying a thumbnail-image list including the thumbnail image.

According to another aspect, there is provided an image display apparatus including a thumbnail-image extractor extracting a thumbnail image corresponding to an input signal; an error detector determining whether the thumbnail image is erroneous; and a display displaying a thumbnail-image list including the thumbnail image if the thumbnail image is determined not to be erroneous.

According to another aspect, there is provided an operating method of an image display apparatus, the operating method including extracting a thumbnail image corresponding to an input signal; determining whether the thumbnail image is erroneous; if the thumbnail image is determined to be erroneous, determining whether to display the thumbnail image; and either displaying a thumbnail-image list including the thumbnail image on a display or acquiring a new thumbnail image corresponding to the input signal according to the results of the determining of whether to display the thumbnail image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of operating an image display apparatus, comprising:
receiving a first input signal;
displaying a first image on a display based on the first input signal;
receiving a second input signal;
generating a first thumbnail image based on the second input signal;
displaying simultaneously a first thumbnail list including the first thumbnail image and a second image based on the first input signal in a compact-view mode,
determining whether an error exists in updating the first thumbnail image; and
if no error exists, or if an error exists and an error ratio of an updated second thumbnail image is less than a reference value, displaying the updated second thumbnail image in the first thumbnail list based on the second input signal; and
displaying a second thumbnail list including a plurality of thumbnail images in full-view mode on the entire display according to a user input, wherein the reference value is set differently for the compact-view mode and the full-view mode.

2. The method of claim 1, wherein determining whether an error exists in updating the first thumbnail image is performed based on at least one of size information, syntax information, checksum information, continuity information or content information corresponding to the second input signal on which the first thumbnail image.

3. The method of claim 1, wherein generating the first thumbnail image comprises:
demultiplexing an input stream corresponding to the second input signal,
generating a primitive thumbnail image from the demultiplexed stream,
encoding the primitive thumbnail image into a thumbnail stream, and
generating the first thumbnail image from the thumbnail stream.

4. The method of claim 1, wherein the first input signal is a first broadcast signal from a first tuner and the second input signal is a second broadcast signal from a second tuner.

5. The method of claim 1, wherein the first thumbnail image list further includes one or more additional thumbnail images except the first thumbnail image, the one or more additional thumbnail images based on one or more input signals different from the first input signal and the second input signal,
displaying source information for the first thumbnail image and the one or more additional thumbnail images, wherein the source information of the first thumbnail image and the source information f the one or more additional thumbnail images are different.

6. The method of claim 1, wherein the first input signal and second input signal are received through different channels or different sources.

7. The method of claim 1, wherein a size of the first image is greater than a size of the second image.

8. The method of claim 1,
wherein a size of thumbnail images displayed in the full-view mode is different from a size or sizes of thumbnail images displayed in the compact-view mode.

9. An image display apparatus comprising:
an input to receive a first input signal and a second input signal;
a generator to generate a first thumbnail image based on the second input signal;
a detector to detect whether an error exists in updating the first thumbnail image; and
a display to display simultaneously a first thumbnail list including the first thumbnail image and a second image based on the first input signal in a compact-view mode, or to display a second thumbnail list including a plurality of thumbnail images in the full-view mode on the entire display according to a user input, wherein if no error exists, or if error exists and error ratio of an updated second thumbnail image is less than a reference value, the display displays an updated second thumbnail image in the first thumbnail list or the second thumbnail list, and wherein the reference value is set differently for a compact-view mode and a full-view mode.

10. The apparatus of claim 9, further comprising:
a channel-browsing processor to generate a primitive thumbnail image from an input stream corresponding to the second input signal and to encode the primitive thumbnail image into a thumbnail stream.

11. The apparatus of claim 10, wherein the channel-browsing processor comprises
a demultiplexer to demultiplex the input stream into a video signal, an audio signal and a data signal,
a picture decoder to decode the video signal,
a format converter to convert the decoded video signal into the primitive thumbnail image,
an image encoder to encode the primitive thumbnail image, and
a stream encoder to encode the encoded primitive thumbnail image into a thumbnail stream.

12. The apparatus of claim 9, wherein the input comprises:
a first tuner to receive the first input signal, and
a second tuner to receive the second input signal.

13. The method of claim 1, wherein the first input signal and the second input signal are received simultaneously.

14. The method of claim 1, wherein the first and second thumbnail image lists have at least one different thumbnail image.

15. The method of claim 1, wherein the first thumbnail image is displayed simultaneously with the first image before said error determining is performed.

16. The method of claim 1, wherein:
the first thumbnail list and the second image are displayed with a first object indicating a full-view mode displaying a second thumbnail list on the entire display and a second object indicating a termination of the compact-view mode, and
the second thumbnail list is further displayed with a third object indicating a termination of the full-view mode.

17. The apparatus of claim 9, wherein:
the first thumbnail list and the second image are displayed with a first object indicating a full-view mode displaying a second thumbnail list on the entire display and a second object indicating a termination of the compact-view mode, and
the second thumbnail list is further displayed with a third object indicating a termination of the full-view mode.

18. The method of claim 1, wherein the second thumbnail list further includes a 'channel lock' menu for locking a thumbnail image so that the thumbnail image cannot be edited, a 'channel edit' menu for editing thumbnail images, and a 'channel align' menu for aligning thumbnail images.

19. The apparatus of claim 9, wherein the second thumbnail list further includes a 'channel lock' menu for locking a thumbnail image so that the thumbnail image cannot be edited, a 'channel edit' menu for editing thumbnail images, and a 'channel align' menu for aligning thumbnail images.

* * * * *